United States Patent
Charbonnel et al.

(10) Patent No.: US 9,511,569 B2
(45) Date of Patent: Dec. 6, 2016

(54) MULTILAYER FILM STRUCTURES COMPRISING BIO-BASED MATERIALS

(75) Inventors: Lucie Charbonnel, Cessy (FR);
Karlheinz Hausmann, Auvernier (CH);
I-Hwa Lee, Wilmington, DE (US);
Cedric Thomi, Sezenove (CH)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 1543 days.

(21) Appl. No.: 12/167,036

(22) Filed: Jul. 2, 2008

(65) Prior Publication Data
US 2009/0017240 A1    Jan. 15, 2009

Related U.S. Application Data

(60) Provisional application No. 60/947,767, filed on Jul. 3, 2007.

(51) Int. Cl.
| | | |
|---|---|---|
| *B32B 27/36* | (2006.01) | |
| *B32B 1/08* | (2006.01) | |
| *B32B 27/32* | (2006.01) | |
| *B32B 27/20* | (2006.01) | |
| *B32B 27/08* | (2006.01) | |
| *B32B 27/06* | (2006.01) | |

(52) U.S. Cl.
CPC ............ *B32B 27/20* (2013.01); *B32B 27/06* (2013.01); *B32B 27/08* (2013.01); *B32B 27/32* (2013.01); *B32B 27/36* (2013.01); *B32B 2307/31* (2013.01); *B32B 2307/5825* (2013.01); *B32B 2307/7163* (2013.01); *B32B 2435/00* (2013.01); *B32B 2439/02* (2013.01); *B32B 2439/46* (2013.01); *Y10T 428/1334* (2015.01); *Y10T 428/269* (2015.01); *Y10T 428/31757* (2015.04); *Y10T 428/31797* (2015.04); *Y10T 442/678* (2015.04)

(58) Field of Classification Search
CPC .......... B32B 27/20; B32B 27/06; B32B 27/08; B32B 27/36; B32B 27/32; B32B 2307/31; B32B 2307/5825; B32B 2439/46; Y10T 442/678; Y10T 428/31797; Y10T 428/31757; Y10T 428/269; Y10T 428/1334

USPC ......... 428/34.3, 35.7, 35.2, 339, 476.9, 483, 428/398

See application file for complete search history.

(56) References Cited

U.S. PATENT DOCUMENTS

| | | |
|---|---|---|
| 5,443,780 A | 8/1995 | Matsumoto |
| 6,114,495 A | 9/2000 | Kolstad |
| 6,323,308 B1 | 11/2001 | Kobayashi |
| 6,417,294 B1 | 7/2002 | Obuchi |
| 6,803,443 B1 | 10/2004 | Ariga |
| 6,943,214 B2 | 9/2005 | Flexman |
| 7,175,917 B2 | 2/2007 | Sukigara |
| 2004/0054051 A1* | 3/2004 | Ouchi et al. .................. 524/314 |
| 2004/0126529 A1* | 7/2004 | Squier et al. ................ 428/40.1 |
| 2004/0219321 A1* | 11/2004 | Squier .................... B32B 27/08 428/40.1 |
| 2004/0242803 A1 | 12/2004 | Ohme |
| 2005/0095383 A1* | 5/2005 | Campbell et al. ........... 428/40.1 |
| 2006/0172131 A1 | 8/2006 | Haedt |
| 2006/0173133 A1 | 8/2006 | Flexman |
| 2007/0031691 A1* | 2/2007 | Forloni et al. ............. 428/475.2 |
| 2008/0220192 A1* | 9/2008 | Lee et al. .................... 428/35.7 |

FOREIGN PATENT DOCUMENTS

| | | |
|---|---|---|
| JP | 4935480 | 4/1974 |
| JP | H06-160314 A1 | 1/1996 |
| JP | H09-286909 A1 | 11/1997 |
| JP | H11-240962 A1 | 9/1999 |
| JP | 2002-146170 A1 | 5/2002 |
| JP | 2007-145937 A1 | 6/2007 |
| WO | 0023520 A1 | 4/2000 |
| WO | 03014224 A2 | 8/2002 |
| WO | 03082980 A1 | 10/2003 |
| WO | 2004101642 A1 | 11/2004 |

OTHER PUBLICATIONS

PCT International Search Report for International Application No. PCT/US2008/068970 dated Sep. 15, 2008.

* cited by examiner

*Primary Examiner* — Gwendolyn Blackwell
*Assistant Examiner* — Kevin Ortman, Jr.

(57) ABSTRACT

A multilayer film structure is disclosed which comprises at least a first layer made of a bio-based polymer composition; a tie layer comprising one or more ethylene copolymers and one or more inorganic fillers; and optionally at least one additional layer.

16 Claims, No Drawings

MULTILAYER FILM STRUCTURES COMPRISING BIO-BASED MATERIALS

The invention relates to multilayer film structures comprising bio-based materials that can be used in food packaging applications.

DESCRIPTION OF THE RELATED ART

The packaging industry uses a wide variety of films and containers prepared from various thermoplastic polymers and compositions for food packaging and non-food products packaging. Food packaging must provide adequate protection in terms of mechanical damage and barrier to air or moisture of the product contained therein.

In recent years, bio-based resins have attracted attention from the viewpoint of environmental conservation and it has become a general trend to replace fossil fuel resources with renewable resources for use as fuel and raw materials for the petroleum-based products. Examples of bio-based resins are polymers from glycosides and poly(hydroxyalkanoic acid) (PHA) polymers such as poly(lactic acid) (PLA). PHA can be polymerized from renewable sources rather than petroleum and are compostable. Being prepared from renewable sources, being biodegradable and bioresorbable, PHA polymers have a broad range of industrial and biomedical applications as films.

U.S. patent application 2006/0172131 discloses peelable/resealable multilayer films for packaging applications. Such multilayer films comprise a heat-sealable polyester layer which can be made of PLA, a pressure sensitive adhesive layer which comprises a tackifier and an elastomeric component and a third layer which can be made of a thermoplastic material, a cellulosic material or a metallic material.

There still remains a need for multilayer film structures for environmentally friendly food packaging that do not deteriorate or delaminate, which means that a strong adhesion or bonding strength between the layers is required.

SUMMARY OF THE INVENTION

A multilayer film structure comprises at least (i) a first layer made of a bio-based polymer composition; (ii) a tie layer comprising one or more a tie layer comprising one or more olefin polymers (homopolymers and/or copolymers) and one or more inorganic fillers; (iii) optionally at least one additional layer.

The inorganic fillers present in the tie layer may confer to the structure an improved adhesion between the first layer and the tie layer thus leading to structures that are more resistant in respect to deterioration or delamination upon use and time if compared with multilayer films of the state of the art.

Also provided is an article made of the multilayer film structure described above for food packaging.

DETAILED DESCRIPTION OF THE INVENTION

By "compostable polymers", it is meant polymers that are degradable under composting conditions. They break down under the action of organisms (annelids) and microorganisms (bacteria, fungi, algae), achieve total mineralization (conversion into carbon dioxide, methane, water, inorganic compounds or biomass under aerobic conditions) at a high rate and are compatible with the composting process.

By "biodegradable polymers", it is meant polymers that are capable of undergoing decomposition into carbon dioxide, methane, water, inorganic compounds or biomass in which the predominant mechanism is the enzymatic action of microorganisms that can be measured by standardized tests, in a specified time, reflecting available disposal conditions.

By "renewable polymers", it is meant polymers that comprise or are prepared from raw or starting materials that are or can be replenished within a few years (unlike petroleum which requires thousands or millions of years) for example by fermentation and other processes that convert biological materials into feedstock or into the final renewable polymer.

By "bioresorbable polymers", it is meant polymers that can be assimilated by a biological system.

The first layer of the multilayer film structure is an outside layer. "Outside layer" refers to the exterior layer of a multilayer structure which is used for packaging a product, such exterior layer faces the environment. Preferably, bio-based polymers used for the first layer of the present invention are poly(hydroxyalkanoic acid)s (PHA) or bio-based polyesters.

PHA polymers are biodegradable polymers and a large number thereof are available from processing renewable resources, such as production by bacterial fermentation processes or isolated from plant matter that include corn, sweet potatoes, and the like.

PHA polymers are polycondensates of one or more hydroxyalkanoic acids. Examples of such hydroxyalkanoic acids comprised in the polymer composition of the first layer of the present invention are glycolic acid; hydroxypropanoic acid (also know as lactic acid), hydroxybutyric acid, hydroxyisobutanoic acid, hydroxypentanoic acid (also known as hydroxyvaleric acid), hydroxyhexanoic acid (also known as polycaprolactone, PCL), hydroxyheptanoic acid, hydroxyoctanoic acid, hydroxydecanoic acid, hydroxydodecanoic acid, hydroxytetradecanoic acid or combinations of two of more thereof.

Preferably, the PHA polymer used in the first layer comprises glycolic acid (PGA), lactic acid (PLA), hydroxybutyric acid (PHB) or combinations of two or more thereof. More preferably, the PHA polymer used in the first layer of the multilayer film structure comprises lactic acid. PLA includes poly(lactic acid) homopolymers and copolymers of lactic acid and other monomers containing at least 50 mol-% of repeat units derived from lactic acid, its derivatives and mixtures thereof having an average molecular weight of 3,000 to 1,000,000 g/mol, 10,000 to 700,000 g/mol, or 20,000 to 600,000 g/mol. For example, PLA may contain at least 70 mol-% of repeat units derived from (e.g., made by) lactic acid or its derivatives. PLA homopolymers and copolymers can be derived from d-lactic acid, l-lactic acid, or mixtures thereof.

PHA polymers may be produced by bulk polymerization. The bulk polymerization is usually carried out using either a continuous process that is described in JP-A 03-502115, JP-A 07-26001 and JP-A 07-53684 or a batch process that is described in U.S. Pat. Nos. 2,668,162 and 3,297,033. PHA polymers may be synthesized through the dehydration-polycondensation of the corresponding hydroxyalkanoic acid. PHA polymers may be synthesized through the dealcoholization-polycondensation of an alkyl ester of hydroxyalkanoic acid or by ring-opening polymerization of a cyclic derivative such as the corresponding lactone or cyclic dimeric ester. PHA polymers and copolymers may also be made by living organisms or isolated from plant matter. U.S.

Pat. No. 6,323,010 discloses a number of PHA copolymers prepared from genetically modified organisms.

Bio-based polyesters are polycondensation product of a diol, preferably a biochemically or fermentatively produced 1,3-propanediol (hereafter called bio-PDO), and a dicarboxylic acid. Biochemically or fermentatively produced 1,3-propanediol or PDO is, by definition, from renewable resources. Biochemical routes to 1,3-propanediol have been described that utilize feedstocks produced from biological and renewable resources such as corn feed stock. For example, bacterial strains able to convert glycerol into 1,3-propanediol are found in e.g., in the species *Klebsiella, Citrobacter, Clostridium,* and *Lactobacillus*. The technique is disclosed in several patents, including, U.S. Pat. Nos. 5,633,362, 5,686,276, and, most recently, U.S. Pat. No. 5,821,092, all of which are incorporated herein by reference. In U.S. Pat. No. 5,821,092, Nagarajan et al., disclose inter alia, a process for the biological production of 1,3-propanediol from glycerol using recombinant organisms. The process incorporates *E. coli* bacteria, transformed with a heterologous pdu diol dehydratase gene, having specificity for 1,2-propanediol. The transformed *E. coli* is grown in the presence of glycerol as a carbon source and 1,3-propanediol is isolated from the growth media. Recombinant microorganisms are disclosed in U.S. Pat. No. 5,686,276, Laffend et al., that convert glucose (e.g., corn sugar) or other carbohydrates (other than glycerol and dihydroxyacetone) to glycerol and then to 1,3-propanediol. Preferred examples of bio-based polyesters are poly(1,3-propylene terephthalate), poly(1,3-propylene naphthalate) and poly(1,3-propylene isophthalate), and poly(1,3-propylene terephthalate) being the most preferred.

The composition of the first layer may further include modifiers and other additives, including without limitation, plasticizers, impact modifiers, stabilizers including viscosity stabilizers and hydrolytic stabilizers, lubricants, antioxidants, UV light stabilizers, antifog agents, antistatic agents, dyes, pigments or other coloring agents, fillers, flame retardant agents, reinforcing agents, foaming and blowing agents and processing aids known in the polymer compounding art like for example antiblock agents and release agents. These additives may be present in the bio-based polymer composition used in the first layer of the present invention in an amount up to 20 wt-%, preferably from 0.01 to 7 wt-%, and more preferably from 0.01 to 5 wt-%, the weight percentage being based on the total weight of the composition of the first layer.

The thickness of the first layer may be chosen depending on the end-use of the food packaging. Typically, when used in a flexible multilayer structure, the first layer has a thickness between 10 and 50 μm, and when used in a rigid multilayer structure, it has a thickness between 10 and 1000 μm.

The tie layer comprises one or more olefin homopolymers and/or copolymers. The tie layer is adjacent to the first layer and to the at least one additional layer. Preferably, the one or more olefin homopolymers and/or copolymers are chosen among polyethylene, propylene homopolymers and/or copolymers, ethylene copolymers and mixtures thereof. Preferably, the one or more olefin homopolymers and/or copolymers comprised in the tie layer are an amount of 50 to 95 wt-%, and more preferably in an amount of 70 to 90 wt-%, the weight percentage being based on the total weight of the tie layer.

Polyethylenes are preferably selected from homopolymers and copolymers of ethylene. Various types of polyethylene homopolymers may be used in the tie layer, like for example, ultra low density polyethylene (ULDPE), very low density polyethylene (VLDPE), low density polyethylene (LDPE), linear low density polyethylene (LLPE), high density polyethylene (HDPE) or metallocene polyethylene (mPE). Polyethylene may be made by any available process known in the art including high pressure gas, low pressure gas, solution and slurry processes employing conventional Ziegler-Natta, metallocene, and late transition metal complex catalyst systems.

Polypropylenes include homopolymers, random copolymers, block copolymers, terpolymers of propylene, or combinations or two or more thereof. Copolymers of propylene include copolymers of propylene with other olefin such as ethylene, 1-butene, 2-butene and the various pentene isomers, etc. and preferably copolymers of propylene with ethylene. Terpolymers of propylene include copolymers of propylene with ethylene and one other olefin. Random copolymers (statistical copolymers) have propylene and the comonomer(s) randomly distributed throughout the polymeric chain in ratios corresponding to the feed ratio of the propylene to the comonomer(s). Block copolymers are made up of chain segments consisting of propylene homopolymer and of chain segments consisting of, for example, random copolymers of propylene and ethylene.

Polypropylene homopolymers or random copolymers can be manufactured by any known process (e.g., using Ziegler-Natta catalyst, based on organometallic compounds or on solids containing titanium trichloride). Block copolymers can be manufactured similarly, except that propylene is generally first polymerized by itself in a first stage and propylene and additional comonomers such as ethylene are then polymerized, in a second stage, in the presence of the polymer obtained during the first. Because the processes for making polypropylenes are well known to one skilled in the art, the description of which is omitted herein for the interest of brevity.

"Ethylene copolymer" refers to a polymer comprising repeat units derived from ethylene and at least one additional monomer.

The one or more ethylene copolymers comprised in the tie layer of the multilayer structure may be chosen among ethylene α-olefin, ethylene vinyl acetate copolymers, ethylene alkyl (meth)acrylate copolymers, or combinations of two or more thereof. "Alkyl (meth)acrylate" refers to alkyl acrylate and/or alkyl methacrylate. Ethylene alkyl (meth) acrylate copolymers are thermoplastic ethylene copolymers derived from the copolymerization of ethylene comonomer and at least one alkyl (meth)acrylate comonomer, wherein the alkyl group contains from one to ten carbon atoms and preferably from one to four carbon atoms. More preferably, the ethylene copolymer comprised in the tie layer are chosen among ethylene α-olefin, ethylene vinyl acetate copolymers, ethylene methyl (meth)acrylate copolymers, ethylene ethyl (meth)acrylate copolymers, ethylene butyl (meth)acrylate copolymers, or combinations of two or more thereof.

When the ethylene copolymer used in the tie layer is an ethylene α-olefin copolymer, it comprises ethylene and an α-olefin of three to twenty carbon atoms. Preferred α-olefin include four to eight carbon atoms.

Typically, the density of the ethylene α-olefin copolymers ranges from 0.860 g/cc to 0.925 g/cc, preferably from 0.860 g/cc to 0.910 g/cc and more preferably between 0.880 g/cc to 0.905 g/cc. Resins made by Ziegler-Natta type catalysis and by metallocene or single site catalysis are included provided they fall within the density ranges so described. The metallocene or single site resins useful herein are (i) those which have an I-10/I-2 ratio of less than 5.63 and an Mw/Mn (polydispersivity) of greater than (I-10/I-2)–4.63, and (ii) those based which have an I-10/I-2 ratio of equal to or greater than 5.63 and a polydispersivity equal to or less than (I-10/I-2)–4.63. Preferably the metallocene resins of group (ii) will have a polydispersivity of greater than 1.5 but less than or equal to (I-10/I-2)–4.63. Suitable conditions and catalysts which can produce substantially linear metallocene resins are described in U.S. Pat. No. 5,278,272. The reference gives full descriptions of the measurement of the well-known rheological parameters I-10 and I-2, which are flow values under different load and hence shear conditions. It also provides details of measurements of the well-known Mw/Mn ratio determination, as determined by gel-permeation chromatography (GPC).

When the ethylene copolymer used in the tie layer is an ethylene vinyl acetate copolymer, the relative amount of copolymerized vinyl acetate units is from 2 to 40 wt-%, preferably from 10 to 40 wt-%, the weight percentage being based on the total weight of the ethylene copolymer. A mixture of two or more different ethylene vinyl acetate copolymers can be used as components of the tie layer in place of a single copolymer.

When the ethylene copolymer is an alkyl (meth)acrylates, the relative amount of copolymerized alkyl (meth)acrylate units is from 0.1 to 45 wt-%, preferably from 5 to 35 wt-% and still more preferably from 8 to 28 wt-%, the weight percentage being based on the total weight of the ethylene copolymer.

The one or more olefin homopolymers and/or copolymers can be modified copolymer, meaning that the copolymer is grafted and/or copolymerized with organic functionalities. Modified polymers for use in the tie layer may be modified with acid, anhydride and/or epoxide functionalities. Examples of the acids and anhydrides used to modify polymers, which may be mono-, di- or polycarboxylic acids are acrylic acid, methacrylic acid, maleic acid, maleic acid monoethylester, fumaric acid, furnaric acid, itaconic acid, crotonic acid, itaconic anhydride, maleic anhydride and substituted maleic anhydride, e.g. dimethyl maleic anhydride or citrotonic anhydride, nadic anhydride, nadic methyl anhydride, and tetrahydrophthalic anhydride, or combinations of two or more thereof, maleic anhydride being preferred.

When acid-modified polymer is used, it may contain from 0.05 to 19 wt-% of an acid, the weight % being based on the total weight of the modified polymer.

When anhydride-modified polymer is used, it may contain from 0.03 to 2 wt-%, preferably from 0.05 to 2 wt-% of an anhydride, the weight percentage being based on the total weight of the modified ethylene polymer.

Examples of epoxides used to modify polymers are unsaturated epoxides comprising from four to eleven carbon atoms, such as glycidyl (meth)acrylate, allyl glycidyl ether, vinyl glycidyl ether and glycidyl itaconate, glycidyl (meth) acrylates being particularly preferred. Epoxide-modified ethylene copolymers preferably contain from 0.05 to 15 wt-% of an epoxide, the weight percentage being based on the total weight of the modified ethylene copolymer. Preferably, epoxides used to modify ethylene copolymers are glycidyl (meth)acrylates. The ethylene/glycidyl (meth)acrylate copolymer may further contain copolymerized units of an alkyl (meth)acrylate having from one to six carbon atoms and an α-olefin having 1-8 carbon atoms. Representative alkyl (meth)acrylates include methyl (meth)acrylate, ethyl (meth)acrylate, propyl (meth)acrylate, butyl (meth)acrylate, isobutyl (meth)acrylate, hexyl (meth)acrylate, or combinations of two or more thereof. Of note are ethyl acrylate and butyl acrylate. The α-olefin can be selected from the group of propylene, octene, butene and hexane, especially propylene.

Preferably, modified ethylene copolymers comprised in the tie layer are modified with acid, anhydride and/or glycidyl (meth)acrylate functionalities.

Olefins homopolymers and/or copolymers and modified polymers useful for the present invention are commercially available under the trademarks Appeel®, Bynel®, Elvaloy® AC and Elvax® from E. I. du Pont de Nemours and Company, Wilmington, Del. (DuPont).

The ethylene copolymers suitable for use in the tie layer of the multilayer film structure of the present invention can be produced by any means known to one skilled in the art using either autoclave or tubular reactors (e.g. U.S. Pat. Nos. 3,404,134, 5,028,674, 6,500,888, 3,350,372 and 3,756,996).

The tie layer comprises one or more inorganic fillers, which can be present in an amount of 5 to 50 wt-% or 10 to 30 wt-%, the weight % being based on the total weight of the tie layer. Suitable inorganic fillers include, but are not necessarily limited to, talc, calcium carbonate, calcinated clay, mica, zinc borate, or combinations of two or more thereof. Preferably, the inorganic filler is talc. Talc is a naturally occurring talc or a synthetically prepared talc and may have an average diameter (D98 value) of less than or equal to 20 µm, or preferably of less than or equal to 15 µm. The D98 value is the average diameter of 98 wt-% of the particles and is measured by the sedimentation method on a Sedigraph 5100. Suitable examples of talc that can be used in the tie layer are Finntalc M05SL supplied by Mondo Minerals OY (Finland) and Luzenac 10MOOS supplied by Luzenac (France).

The tie layer may further comprise one or more tackifiers, preferably in an amount of 0.1 to 20 wt-% or 5 to 15 wt-%, the weight percentage being based on the total weight of the tie layer, to improve the adhesion between the tie layer and the first layer. Tackifiers are known to enhance initial adhesion to differentiated substrates and may improved wetting during application of the adhesive and lowers resistance to deformation of the tie composition and hence facilitates bond formation on contact. The tackifier (also called tackifying resin) may be any suitable tackifier known generally in the art. For example, the tackifier may include, but is not limited to, classes listed in U.S. Pat. No. 3,484,405. Such tackifiers include a variety of natural and synthetic resins and rosin materials. Tackifier resins that can be employed are liquid, semi-solid to solid, complex amorphous materials generally in the form of mixtures of organic compounds having no definite melting point and no tendency to crystallize. Such resins may be insoluble in water and can be of vegetable or animal origin, or can be synthetic resins. A comprehensive listing of tackifiers that can be employed in this invention is provided in the TAPPI CA Report #55, February 1975, pages 13-20, a publication of the Technical Association of the Pulp and Paper Industry, Atlanta, Ga., which lists over 200 commercially available tackifiers. Preferably, tackifiers that are used in the tie layer are chosen among coumarone-indene resins, terpene resins, butadiene-styrene resins, polybutadiene resins, hydrocarbon resins, rosins, and mixtures thereof.

The tie layer may further comprise various commonly used additives and fillers such as those described above for the first layer.

The thickness of the tie layer of the multilayer structure may be between 1 and 100 µm, 5 and 50 µm, or 5 to 30 µm.

The multilayer film structure optionally comprises at least one additional layer. The least one additional layer may be the inside layer. "Inside layer" refers to the layer of a multilayer structure which is used for packaging a product and which faces the contained product. Preferably, the multilayer film structure comprises at least one additional layer.

The additional layer may be chosen among a heat sealable layer, a foil, a paperboard. a nonwoven material, or combinations or two or more thereof.

Under "heat sealable layer" it is meant a layer that is capable of fusion bonding on another layer by conventional means without losing the whole structure integrity like for example co-extrusion, welding or heat sealing, without losing the whole structure integrity. The heat sealable layer may comprise, but is not limited to poly(hydroxyalkanoic acid)s, glycosides, polyethylenes, polypropylenes, polyesters, polyamides, ethylene vinyl acetate copolymers, ethylene alkyl (meth)acrylate copolymers; ethylene acid copolymers, ionomers, or combinations or two or more thereof.

The at least one additional layer may comprise a PHA polymer disclosed above.

Glycosides include one or more substances containing or joined by glycosidic bonds. A glycosidic bond can join two or more monosaccharides such as glucose or fructose to form a disaccharide or polysaccharide.

Polysaccharides include starch, glycogen, chitin, cellulose, hemicellulose, pectin, lignin (is not a polysaccharide), agar, alginic acid or salt thereof, gum Arabic, xanthan gum, or combinations of two or more thereof. Preferably, when a glycoside is used in the at least one additional layer, the glycoside is starch.

Starch is a polysaccharide, i.e. a glycoside polymer including one or more substances containing or joined by glycosidic bonds. A glycosidic bond can join monosaccharides such as glucose or fructose to form a polysaccharide. Starch occurs in two forms, $\alpha$-amylose and amylopectin. The mole ratio of amylose to amylopectin can be in the range of from 0.1:1 to 10:1, 0.5:1 to 5:1, or 1:2 to 2:1.

Starch can be present in nonionic, cationic, anionic, or amphoteric form. For example, cationic starch may be derived from any common starch producing materials such as corn starch, potato starch, waxy maize starch and wheat starch. Amphoteric starch includes naturally occurring starch such as potato starch or synthetic amphoteric starch. Cationization can be achieved by any of known commercially known procedures, such as addition of 3-chloro-2-hydroxypropyltrimethylammonium chloride to obtain cationic starches with various degrees of nitrogen substitution.

Starch can be modified in many ways for industrial uses, such as acid-, oxidation-, hydroxyalkyl-, enzyme-, ester-, and phosphate-modified. Modified starch, based on degree of hydrolysis quantified by dextrose equivalents, can include maltodextrin, corn syrup, dextrin, or combinations of two or more thereof. Modified starch can also include starch obtained by mixing starch solution or dispersion with an aqueous solution or dispersion of at least one amphoteric or cationic with at least one polyacrylamide which can be nonionic, amphoteric, cationic, or anionic polyacrylamide as disclosed in U.S. Pat. Nos. 5,859,128, 5,928,474, 6,048,929 and 6,699,363. For example, cationic polyacrylamide may have a degree of cationic substitution by weight from 1 to 80 wt-% (the polymer contain randomly repeat monomer units containing chemical functionality which, when dissolved in water, become cationically charged). These monomer units include, but are not limited to, amine groups.

The additional layer may comprise one or more polyesters, polyethylenes disclosed above, polyamides, ethylene acid copolymers, ionomers, or polypropylenes.

Polyesters include polymers derived from condensation of diols and diacids (or derivatives thereof) that are suitable for forming films. Polyesters for use in the at least one additional layer comprise aromatic dicarboxylic acids as the main acid component. Examples include polyethylene terephthalate (PET), polytetramethylene terephthalate, polycyclohexane-dimethylene terephthalate, polyethylene-2,6-naphthalene dicarboxylate, or combinations or two or more thereof, PET being preferred.

Polyamides include aliphatic polyamides, semi aromatic polyamides and amorphous polyamides. As used herein the term polyamide also includes polyamide nano-composites such as those available commercially under the tradename Aegis® polyamides from Honeywell or Imperm® polyamide (nylon MXD6) from Mitsubishi Gas Chemicals/Nanocor.

The ethylene acid copolymer comprises repeat units derived from ethylene and one or more ethylene $C_3$-$C_8$ $\alpha,\beta$-unsaturated carboxylic acid including acrylic acid, methacrylic acid, or combinations thereof. Ethylene acid copolymers are commercially available under the trademark Nucrel® from DuPont.

Ionomers are thermoplastic resins that contain metal ions in addition to the organic backbone of the polymer such as ethylene acid copolymer disclosed above and are commercially available under the trademark Surlyn® from DuPont.

The multilayer film structure may further comprise at least one functional layer, which can be positioned between the tie layer and the at least one additional layer. The functional layer adheres to the at least one additional layer trough at least one other tie layer.

The functional layer may act as a barrier layer. By "barrier layer", it is meant a layer which confers to the multilayer film structure a low gas (e.g. oxygen, carbon dioxide or nitrogen) and/or water vapor transmission rate, and/or high barrier properties against the transmission of flavors. Examples of suitable polymers for the functional layer include, but are not necessarily limited to, starch, ethylene vinyl alcohol polymers (EVOH) and polyamides.

The second tie layer positioned between the functional layer and the additional layer can be made of any suitable polymeric composition allowing a good adhesion between such layers. When starch is used as material for the functional layer, the at least one tie layer preferably comprises one or more modified ethylene copolymers, meaning that they are grafted and/or copolymerized with organic functionalities as described above.

An example of a multilayer film structure according to the present invention is a multilayer comprising i) a first layer made of a poly(hydroxyalkanoic acid) (PHA) composition disclosed above, ii) a tie layer comprising one or more ethylene copolymers modified with acid, anhydride and/or epoxide functionalities and one or more inorganic fillers, iii) at least one functional layer made of starch as disclosed above, iv) a tie layer comprising one or more modified ethylene copolymers and v) at least additional layers as disclosed above. Preferably, the at least one additional layer comprises a poly(hydroxyalkanoic acid) (PHA) compositions such as those described above.

The multilayer film structure may also be further processed by, for example, printing, embossing, and/or coloring to have a packaging material providing information to the consumer about the product it contains and/or providing a pleasing appearance of the packaging itself.

The compositions used in the multilayer film structure may be obtained by combining the polymeric components and non-polymeric ingredients by using any melt-mixing method known in the art. For example, the polymeric components and non-polymeric ingredients may be added to a melt mixer, such as, for example, a single or twin-screw extruder; a blender, a single or twin-screw kneader, a Haake mixer, a Brabender mixer, a Banbury mixer, or a roll mixer, either all at once through a single step addition, or in a stepwise fashion, and then melt-mixed. When adding the polymeric components and non-polymeric ingredients in a stepwise fashion, part of the polymeric components and/or non-polymeric ingredients are first added and melt-mixed with the remaining polymeric components and non-polymeric ingredients being subsequently added and further melt-mixed until a well-mixed composition is obtained.

The multilayer film structures can be prepared by conventional methods such as for example co-extrusion, or co-extrusion followed by lamination of one or more layers onto the previously co-extruded layers or heat lamination. Suitable extrusion techniques include blown film extrusion, cast film extrusion, cast sheet extrusion, extrusion coating, double bubble co-extrusion and tandem extrusion. A preferred multilayer film structure is a blown film obtained through blown film extrusion.

Another aspect of the present invention relates to a packaging comprising the multilayer structure described above. Examples of packaging include without limitation injection molded articles, blow molded articles, pressed articles, thermoformed rigid articles, blisters, thermoform blisters or combinations of two or more thereof. Packaging elements, such as lids, caps, cups, trays and bags are also examples of articles which can be prepared with the multilayer film structure disclosed herein.

The invention will be further described in the Examples below.

EXAMPLES

The following materials were used for preparing the multilayer film structures according to the invention and comparative multilayer film structures:

A) Two-layer Structures Comprising First Layer Based on PLA.

First layer based on PLA: a film made of poly(lactic acid) with a melting point of about 150° C. and a $T_g$ of about 55° C. and having a thickness of 550 μm. Such PLA polymers were commercially available as PLA NW2002D by NATUREWORKS LLC, a subsidiary of Cargill, Inc. (Minnetonka, Minn., USA).

EVA 1: an ethylene vinyl acetate copolymer (28 wt-% VA).

MAH-g-EVA 1: an ethylene vinyl acetate copolymer grafted with maleic anhydride (28 wt-% VA, 0.6 wt-% grafted maleic anhydride).

MAH-g-EVA 2: an ethylene vinyl acetate copolymer grafted with maleic anhydride (25-28 wt-% VA, 0.3 wt-% grafted maleic anhydride).

EMA 1: an ethylene methyl acrylate copolymer (9 wt-% MA).

EMA 2: an ethylene methyl acrylate copolymer (20 wt-% MA).

Tackifier: a hydrocarbon resin commercially available Regalite® R1125 by Eastman Chemical Company (Kingsport, Tenn., USA).

Additives: phenolic antioxidant such as Irganox® 1010m supplied by Ciba Specialty Chemicals (Tarrytown, N.Y., USA) and slip agents such as fatty acid amides.

Polyethylene: mLLDPE was metallocene based linear low density polyethylene with a density of 0.902 g/cm³ according to ASTM D 792 and a MFI of 3 g/10 min commercially available as Engage™ 8450 by Dow Chemicals (Midland, Mich.).

Talc: Luzenac 10MOOS supplied by Luzenac (Toulouse, France). (Moisture content (105° C.)<0.5% according to ISO 787/2).

Compositions of the tie layer of the comparative samples (C1-C3) and of the invention sample (E1-E2) are presented in Table 1.

TABLE 1

Compositions of the tie layers used in the comparative multilayer structures (C1-C3) and in the multilayer according to the invention (E1-E2).

| | composition of the tie layer | | | | |
|---|---|---|---|---|---|
| | C1 | C2 | C3 | E1 | E2 |
| ethylene copolymer | EVA 1 | MAH-g-EVA 1 | EMA 1 | EMA 1 | MAH-g-EVA 2 |
| ethylene copolymer/wt-% | 40 | 86.9 | 88.4 | 70.9 | 56.5 |
| ethylene copolymer EMA 2/wt-% | — | — | — | — | 17.2 |
| tackifier/wt-% | 20 | 10 | 8 | 8 | 6.5 |
| additive/wt-% | 0.05 | 0.6 | 1.6 | 1.6 | 0.7 |
| polyethylene/wt-% | 39.95 | 2.5 | 2 | 2 | 1.6 |
| talc/wt-% | — | — | — | 17.5 | 17.5 |

The weight percentages are based on the total weight of each of the tie layer.

Compounding: The compositions of the tie layers were compounded in a 24 mm PRISM twin screw extruder at 170° C. The ingredients were introduced in the extruder as a salt and pepper blend and the extrudate material was granulated after exiting the extruder.

Tie layer film preparation: Granulates obtained as described above were melted in a Brabender 24 mm single-screw extruder where 100 μm thick films were extruded. The Brabender single screw extruder temperatures were set for four extruder zones of the same length, according to the following temperature profile:

| zone 1 | zone 2 | zone 3 | zone 4 | die |
|---|---|---|---|---|
| 130° C. | 150° C. | 160° C. | 170° C. | 170° C. |

The line speed was 6.2 m/min. Rolls of film were produced in a width of 135 mm and a length of 10 m.

Multilayer preparation: strips of 15 mm width were cut from the prepared films in the machine direction. The samples were heat sealed on a Sentinel Heat Sealer (Packaging industry, Mass., USA, Model 12AS) with an upper heated bar and a lower flexible bar under the following conditions: pressure 3 bar, temperature 160° C. and sealing time 1 second. To avoid sticking of the tie layer to the heated bar, a 20 μm polyester film (commercially available from E. I. du Pont de Nemours and Company, Wilmington, Del. under the trademark Mylar®) was used to cover each sample on the side of the tie layer (Mylar®/tie layer/PLA) and heat sealing was performed on the side of the Mylar® layer.

Comparative multilayer film structures (C1-C3) and the multilayer film structures of the invention (E1-E2) had the following structures:

Comparative Example 1 (C1): a two-layer structure comprising a tie layer based on ethylene copolymer EVA and additives without talc (as described in Table 1) with a thickness of 100 μm and a second layer made of PLA with a thickness of 550 μm.

Comparative example 2 (C2): a two-layer structure comprising a tie layer based on ethylene copolymer MAH-g-EVA and additives without talc (as described in Table 1) with a thickness of 100 µm and a second layer made of PLA with a thickness of 550 µm.

Comparative example 3 (C3): a two-layer structure comprising a tie layer based on ethylene copolymer EMA and additives without talc (as described in Table 1) with a thickness of 100 µm and a second layer made of PLA with a thickness of 550 µm.

Example 1 (E1): a two-layer structure comprising a tie layer based on ethylene copolymer EMA and additives including talc (as described in Table 1) with a thickness of 100 µm and a second layer made of PLA with a thickness of 550 µm.

Example 2 (E2): a two-layer structure comprising a tie layer based on ethylene copolymer MAH-g-EVA and additives including talc (as described in Table 1) with a thickness of 100 µm and a second layer made of PLA with a thickness of 550 µm.

Heat seal strength test: Seal strength of each of the prepared multilayer was measured after removing the Mylar® protecting film and after conditioning the two-layer structures at 23° C. and 50% relative humidity for 24 hours. Seal strength was measured in a tensile tester (Zwick AG, Germany) at a pulling angle of 180° and at 100 mm/min. Seal strength values (average of at least three measurements) of the comparative multilayer film structures (C1-C3) and the invention multilayer film structures (E1-E2) are presented in Table 2 and are given in N/15 mm.

TABLE 2

Seal strength of the comparative multilayer film structures (C1-C3) and the multilayer film structures according to the invention (E1-E2).

| | Multilayer structures tie layer/first layer | | | | |
|---|---|---|---|---|---|
| | C1 | C2 | C3 | E1 | E2 |
| Seal strength/N/15 mm | 2 | 3 | 1.5 | 7 | 7.5 |

As shown in Table 2, samples E1 and E2 of the invention provided a stronger seal strength adhesion than the comparative samples C1-C3. Particularly, a force of 7 N/15 mm was required to rupture the seals of the multilayer film structure E1. This corresponds to a five times increase of seal strength in comparison with the comparative sample C3 wherein the tie layer comprised the same composition without talc despite the absence of MAH in the formulation which usually improves the adhesion of tie layers to substrates such as PLA. A force of 7.5 N/15 mm was required to rupture the seals of the multilayer film structure E2. This corresponds to a 2.5 times increase of seal strength in comparison with the comparative sample C2 wherein the tie layer comprised the same composition without talc.

Surprisingly, the incorporation of talc in the tie layer leads to a strongly increased adhesion between said tie layer and the first layer made of a bio-based material (i.e. PLA) (E1-E2) in comparison with the multilayer structures that do not comprise such inorganic filler in the tie layer (C1-C3).

B) Co-extruded Three-layer Structures Comprising a First Layer Based on a Bio-Based Polyester.

Bio-based polyester (as component for the first layer): a poly(1,3-propylene terephthalate) (bio-sourced 37 wt-%) commercially available as Biomax® PTT from E. I. du Pont de Nemours and Company, Wilmington, Del., USA.

HDPE (as component of the additional layer): a high density polyethylene having a melt index of 1 g/10 minutes and a density of 0.962 g/cc, commercially available as Marflex™ from Chevron Phillips Chemical Company LP (Kingsport, Woodlands, USA). Components of the tie layer:

MAH-g-EVA 2: an ethylene vinyl acetate copolymer grafted with maleic anhydride (25-28 wt-% VA, 0.3 wt-% grafted maleic anhydride).

MAH-g-EVA 3: an ethylene vinyl acetate copolymer grafted with maleic anhydride (25-28 wt-% VA, 0.12 wt-% grafted maleic anhydride).

EMA 1: an ethylene methyl acrylate copolymer (9 wt-% MA).

EMA 2: an ethylene methyl acrylate copolymer (20 wt-% MA).

EMA 3: an ethylene methyl acrylate copolymer (24 wt-% MA).

Tackifier: a hydrocarbon resin commercially available Piccolyte by Eastman Chemical Company (Kingsport, Tenn., USA).

Additives: phenolic antioxidant such as Irganox® 1010 supplied by Ciba Specialty Chemicals (Tarrytown, N.Y., USA) and slip agents such as fatty acid amides.

Polyethylene: mLLDPE was metallocene based linear low density polyethylene with a density of 0.902 g/cm$^3$ according to ASTM D 792 and a MFI of 3 g/10 min commercially available as Engage™ 8450 by Dow Chemicals (Midland, Mich.).

Talc: Luzenac 10MOOS supplied by Luzenac (Toulouse, France). (Moisture content (105° C.)<0.5% according to ISO 787/2).

Compositions of the tie layer of the comparative samples (C4-C6) and of the invention sample (E3) are presented in Table 3.

TABLE 3

Compositions of the tie layers used in the comparative co-extruded structures (C5-C7) and in the multilayer according to the invention (E3).

| | composition of the tie layer | | | |
|---|---|---|---|---|
| | C4 | C5 | C6 | E3 |
| ethylene copolymer | EMA 3 | MAH-g-EVA 3 | MAH-g-EVA 2 | EMA 1 |
| ethylene copolymer/wt-% | 100 | 100 | 86.9 | 35.5 |
| tackifier/wt-% | — | — | 10 | 15.3 |
| ethylene copolymer EMA 2/wt-% | | | | 17.5 |
| additive/wt-% | — | — | 0.6 | 1.6 |
| polyethylene/wt-% | — | — | 2.5 | 12.6 |
| talc/wt-% | — | — | — | 17.5 |

Co-extruded Multilayer Preparation

The tie layers described above (C4-C6 and E3) were co-extruded between an additional layer of HDPE and a first layer of a bio-based polyester Components of the tie layers as described in Table 3 were melted at 245° C. in a 25 mm single screw extruder operating at 29 rpm; the bio-based polyester was melted at 240° C. in a 25 mm single screw extruder operating at 38 rpm; and the HDPE was melted at 240° C. in a 38 mm single screw extruder operating at 92 rpm. All three melt streams were fed through a Brampton™ co-extrusion blown film die so as to form a three layer film made of a 41 microns HDPE layer, a 10 microns tie layer and a 25 microns bio-based polyester layer The die temperature was 255° C. and the blow-up ratio of the blown film was about 2.1.

Seal strength test: Seal strength of each of the prepared multilayer was measured after conditioning the three-layer structures at 23° C. and 50% relative humidity for 24 hours. Seal strength was measured in a tensile tester (Zwick AG, Germany) at a pulling angle of 180° and at 100 mm/min.

Seal strength values (average of at least three measurements) of the comparative multilayer film structures (C4-C6) and the invention multilayer film structure (E3) are presented in Table 4 and are given in N/15 mm.

TABLE 4

Seal strength of the comparative multilayer film structures (C4-C6) and the multilayer film structure according to the invention (E3).

| | Multilayer structures HDPE layer/tie layer/first layer | | | |
|---|---|---|---|---|
| | C4 | C5 | C6 | E3 |
| Seal strength/N/15 mm | 8.4 | 7.8 | 7.2 | 11.3 |

As shown in Table 4, sample E3 of the invention provided a stronger seal strength adhesion than the comparative samples C4-C6 that did not comprise talc in the tie layer. Particularly, a force of 11.3 N/15 mm was required to rupture the seals of the multilayer film structures E3.

Surprisingly, the incorporation of talc in the tie layer leads to a strongly increased adhesion between said tie layer and the first layer made of a bio-based material (i.e. PLA or bio-based polyester) (E1-E3) in comparison with the multilayer structures that do not comprise such inorganic filler in the tie layer (C1-C6).

Such improved adhesion is characteristic of highly performing multilayer film structures in terms of strength and durability of the structure upon use and time. The multilayer film structures of the invention for environmentally friendly food packaging are more resistant in respect to deterioration or delamination upon use and time if compared with multilayer films which do not comprise talc in the tie layer.

The invention claimed is:

1. A multilayer film structure comprising a first layer, a tie layer, and at least one additional layer wherein
   the first layer is made of a bio-based polymer composition, said bio-based polymer comprising a poly(hydroxyalkanoic acid) (PHA) or a bio-based polyester;
   the tie layer is adjacent to and lies between the first layer and the additional layer;
   the tie layer includes 50 to 95 wt %, based on the weight of the tie layer, of an ethylene copolymer and 5 to 50 wt % of a filler;
   the ethylene copolymer is selected from the group consisting of ethylene methyl (meth)acrylate copolymer, ethylene ethyl (meth)acrylate copolymer, ethylene butyl (meth)acrylate copolymer, and combinations of two or more thereof;
   the filler is talc, calcium carbonate, calcinated clay, mica, zinc borate, or combinations of two or more thereof;
   the additional layer is selected from the group consisting of a heat sealable layer, a foil, a paperboard, a nonwoven material, and combinations of two or more thereof; and
   the heat sealable layer is selected from the group consisting of poly(hydroxyalkanoic acid), glycoside, polyethylene, polypropylene, polyester, polyamide, ethylene vinyl acetate copolymer, ethylene alkyl (meth)acrylate copolymer, ethylene acid copolymers, ionomers, and combinations of two or more thereof.

2. The film of claim 1 wherein the poly(hydroxyalkanoic acid) is selected from the group consisting of poly(glycolic acid), poly(lactic acid), poly(hydroxybutyric acid), and combinations of two or more thereof.

3. The film of claim 1 wherein the poly(hydroxyalkanoic acid) is poly(lactic acid) and the ethylene copolymer is selected from the group consisting of the ethylene methyl acrylate copolymer, the ethylene butyl acrylate copolymer, and combinations of two or more thereof.

4. The film of claim 3 wherein the filler is talc.

5. The film of claim 2 wherein the thickness of the tie layer is between 1 and 100 μm.

6. The film of claim 3 wherein the tie layer further comprises, in an amount of 0.1 to 20 wt % based on the weight of the tie layer, one or more tackifiers including coumarone-indene resins, terpene resins, butadiene-styrene resins, polybutadiene resins, hydrocarbon resins, rosins, or combinations of two or more thereof.

7. The film of claim 6 wherein the thickness of the tie layer is between 1 and 100 μm.

8. The film of claim 1 wherein the bio-based polyester is poly(1,3-propylene terephthalate).

9. The film of claim 8 wherein the filler is talc and the tie layer is between 1 and 100 μm in thickness.

10. The film of claim 9 wherein the tie layer further comprises, in an amount of 0.1 to 20 wt % based on the weight of the tie layer, one or more tackifiers including coumarone-indene resins, terpene resins, butadiene-styrene resins, polybutadiene resins, hydrocarbon resins, rosins, or combinations of two or more thereof.

11. An article comprising or produced from a multilayer film wherein the article is injection molded article, blow molded article, pressed article, thermoformed rigid article, a blister, a thermoform blister, or combinations of two or more thereof and the film is as characterized in claim 1.

12. The article of claim 11 wherein the article is a lid, a cap, a cup, a tray, or a bag and the poly(hydroxyalkanoic acid) is a polylactic acid.

13. The article of claim 11 wherein the article is a lid, a cap, a cup, a tray, or a bag and the bio-based polyester is a poly(1,3-propylene terephthalate).

14. A multilayer film structure comprising a first layer, a tie layer, at least one functional layer, a second tie layer, and at least one additional layer wherein
   the first layer is made of a bio-based polymer composition;
   the tie layer lies between the first layer and the additional layer;
   the tie layer includes 50 to 95 wt %, based on the weight of the tie layer, of an olefin polymer selected from the group consisting of polyethylene homopolymer, an ethylene copolymer, or combinations thereof and 5 to 50 wt % of a filler;
   the ethylene copolymer is selected from the group consisting of ethylene vinyl acetate copolymer, ethylene methyl (meth)acrylate copolymer, ethylene ethyl (meth)acrylate copolymer, ethylene butyl (meth)acrylate copolymer, modified ethylene copolymers, and combinations of two or more thereof;
   the filler is talc, calcium carbonate, calcinated clay, mica, zinc borate, or combinations of two or more thereof;

the at least one functional layer is positioned between the tie layer and the second tie layer, wherein the functional layer is made of starch, ethylene vinyl alcohol polymer, polyamide, or combinations of two or more thereof;

the second tie layer is positioned between the functional layer and the additional layer;

the additional layer is selected from the group consisting of a heat sealable layer, a foil, a paperboard, a nonwoven material, and combinations of two or more thereof; and the heat sealable layer is selected from the group consisting of poly(hydroxyalkanoic acid), glycoside, polyethylene, polypropylene, polyester, polyamide, ethylene vinyl acetate copolymer, ethylene alkyl (meth)acrylate copolymer, ethylene acid copolymers, ionomers, and combinations of two or more thereof.

15. The film of claim 14 wherein the ethylene copolymer is the modified ethylene copolymer.

16. The film of claim 15 wherein the modified ethylene copolymer is modified with an acid, an anhydride, a glycidyl functionality, or combinations of two or more thereof.

* * * * *